US011327670B2

(12) United States Patent
Kazi et al.

(10) Patent No.: US 11,327,670 B2
(45) Date of Patent: May 10, 2022

(54) REDUCING POWER CONSUMPTION IN A DISPERSED STORAGE NETWORK

(71) Applicant: INTERNATIONAL BUSINESS MACHINES CORPORATION, Armonk, NY (US)

(72) Inventors: Asimuddin Kazi, Naperville, IL (US); Ethan Wozniak, Cook, IL (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 219 days.

(21) Appl. No.: 16/738,429

(22) Filed: Jan. 9, 2020

(65) Prior Publication Data

US 2021/0216227 A1    Jul. 15, 2021

(51) Int. Cl.
*G06F 1/00* (2006.01)
*G06F 3/06* (2006.01)
*G06F 1/3234* (2019.01)
*G06F 11/30* (2006.01)
*G06F 1/28* (2006.01)
(Continued)

(52) U.S. Cl.
CPC .............. *G06F 3/0634* (2013.01); *G06F 1/28* (2013.01); *G06F 1/3268* (2013.01); *G06F 3/067* (2013.01); *G06F 3/0625* (2013.01); *G06F 3/0653* (2013.01); *G06F 3/0659* (2013.01); *G06F 11/3006* (2013.01); *G06F 11/3034* (2013.01); *G06F 11/3062* (2013.01); *G06Q 20/127* (2013.01); *G06F 1/3203* (2013.01)

(58) Field of Classification Search
CPC ...... G06F 3/0634; G06F 3/067; G06F 3/0653; G06F 3/0659; G06F 3/0625; G06F 1/3268; G06F 11/3006; G06F 11/3034; G06F 11/3062; G06F 1/28; G06Q 20/127
USPC ........................................................ 713/324
See application file for complete search history.

(56) References Cited

U.S. PATENT DOCUMENTS 5,774,292 A * 6/1998 Georgiou .............. G06F 1/3268
                                                                 360/73.03
5,819,100 A * 10/1998 Pearce ................... G11B 19/04
                                                                 713/323
(Continued)

OTHER PUBLICATIONS

Mell et al., "The NIST Definition of Cloud Computing", NIST, Special Publication 800-145, Sep. 2011, 7 pages.

*Primary Examiner* — Volvick Derose
(74) *Attorney, Agent, or Firm* — Randy Emilio Tejeda; Andrew D. Wright; Roberts Calderon Safran & Cole, P.C.

(57) ABSTRACT

Systems and methods for selectively disabling power to disk drives in a distributed storage network (DSN). In embodiments, a method includes: monitoring namespace health parameter data in a DSN including a plurality of storage disk drives, wherein the namespace health parameter data includes available disks of the plurality of storage disk drives; determining that power to a subset of the plurality of storage disk drives can be disabled without disrupting anticipated client access to a data collection based on the monitoring and stored power management rules; and sending instructions to at least one power manager within the DSN to disable power to the subset of the plurality of storage disk drives, resulting in at least one disabled storage disk, wherein the instructions are based on the determining that power to the subset of the plurality of storage disk drives can be disabled.

20 Claims, 5 Drawing Sheets

(51) Int. Cl.
*G06Q 20/12* (2012.01)
*G06F 1/3203* (2019.01)

(56) References Cited

U.S. PATENT DOCUMENTS

| | | | | |
|---|---|---|---|---|
| 2005/0138284 | A1* | 6/2005 | Cohn | G06F 3/0689 |
| | | | | 711/114 |
| 2005/0268119 | A9* | 12/2005 | Guha | G06F 1/3268 |
| | | | | 713/300 |
| 2010/0005261 | A1* | 1/2010 | Shiga | G06F 3/0647 |
| | | | | 711/162 |
| 2012/0233484 | A1* | 9/2012 | Rossi | G06F 3/0634 |
| | | | | 713/324 |
| 2017/0192685 | A1* | 7/2017 | Guyot | G06F 11/3062 |
| 2017/0220463 | A1* | 8/2017 | Malina | G06F 3/0688 |
| 2017/0300234 | A1* | 10/2017 | Toomey | G06F 12/0813 |
| 2018/0103107 | A1* | 4/2018 | Cocagne | H04L 67/1097 |

* cited by examiner

REDUCING POWER CONSUMPTION IN A DISPERSED STORAGE NETWORK

BACKGROUND

Aspects of the present invention relate generally to a dispersed storage network and, more particularly, to selectively reducing power consumption in a dispersed storage network.

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure. A computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Apache Hadoop™ developed by Apache Software Foundation is a collection of open-source software utilities that supports distributed applications enabling application execution by thousands of computers.

In addition to cloud computing, a computer may use "cloud storage" as part of its memory system. Cloud storage enables a user, via its computer, to store files, applications, etc., on an Internet-accessed storage system. The Internet-accessed storage system may include a Redundant Array of Independent Disks (RAID) system and/or a dispersed storage system that uses an error correction scheme to encode data for storage.

In a first aspect of the invention, there is a computer-implemented method including monitoring, by a computing device, namespace health parameter data in a distributed storage network (DSN) including a plurality of storage disk drives, wherein the namespace health parameter data includes available disks of the plurality of storage disk drives; determining, by the computing device, that power to a subset of the plurality of storage disk drives can be disabled without disrupting anticipated client access to a data collection based on the monitoring and stored power management rules; and sending, by the computing device, instructions to at least one power manager within the DSN to disable power to the subset of the plurality of storage disk drives, resulting in at least one disabled storage disk, wherein the instructions are based on the determining that power to the subset of the plurality of storage disk drives can be disabled.

In another aspect of the invention, there is a computer program product including one or more computer readable storage media and program instructions collectively stored on the one or more computer readable storage media. The program instructions are executable by a computing device to cause the computing device to: continuously monitor namespace health parameter data for a plurality of storage disk drives associated with a data collection of a client in a distributed storage network (DSN); and selectively enable and disable power to select ones of the plurality of storage disk drives without disrupting anticipated client access to the data collection based on the monitoring and stored power management rules.

In another aspect of the invention, there is system including a processor, a computer readable memory, and a computer readable storage medium. The system includes program instructions to determine anticipated client access needs with respect to a data collection stored on the DSN based on continuously monitoring namespace health parameter data in a distributed storage network (DSN) including a plurality of storage disk drives; and program instructions to selectively enable and disable power to select ones of the plurality of storage disk drives without disrupting the anticipated client access needs based on the monitoring and stored power management rules. The program instructions are stored on the computer readable storage medium for execution by the processor via the computer readable memory.

BRIEF DESCRIPTION OF THE DRAWINGS

Aspects of the present invention is described in the detailed description which follows, in reference to the noted plurality of drawings by way of non-limiting examples of exemplary embodiments of the present invention.

DETAILED DESCRIPTION

Figure 1:
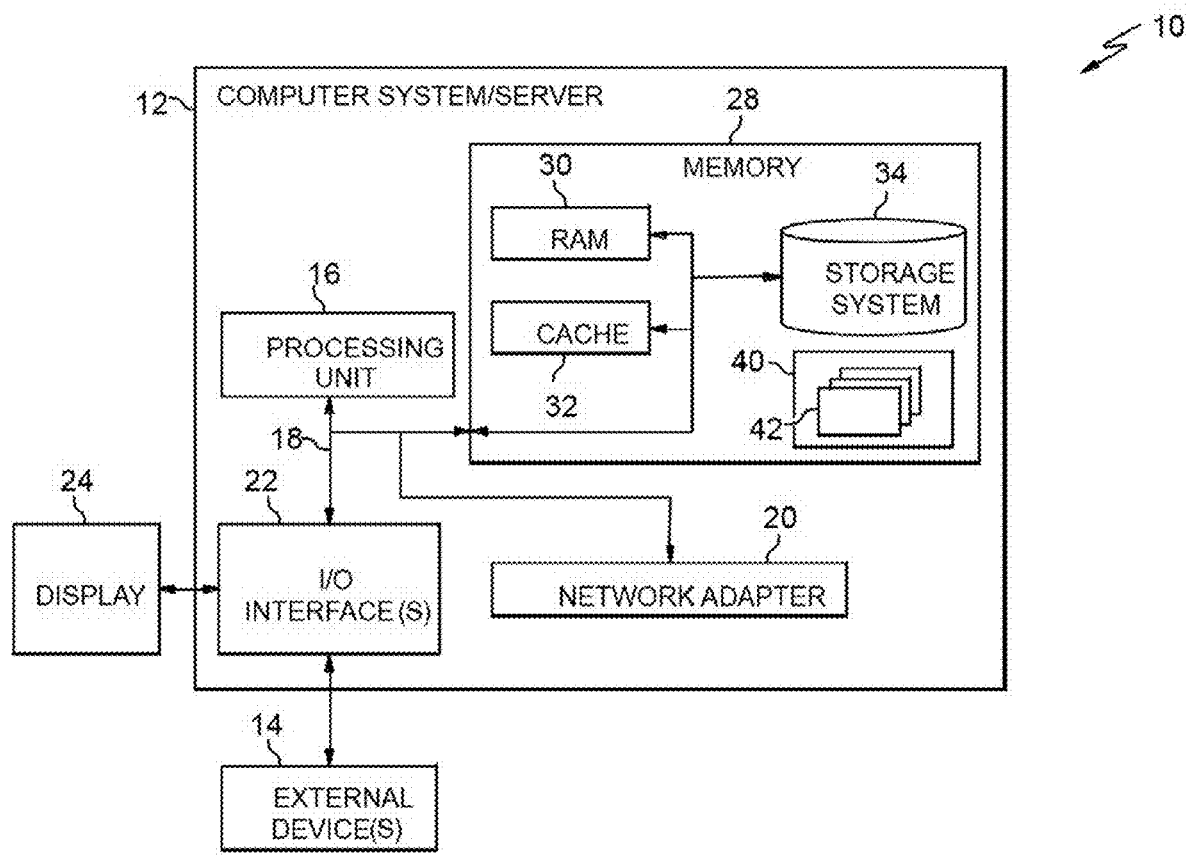
FIG. 1 depicts a cloud computing node according to an embodiment of the present invention.

Aspects of the present invention relate generally to a dispersed storage network and, more particularly, to reducing power consumption in a dispersed storage network. In embodiments, a method is provided for selectively enabling and/or disabling power to storage disks housing a data collection, without disrupting anticipated client access to the data collection, based on namespace health parameter data.

Advantageously, embodiments of the invention reduce energy consumption and extend the life of disk drives within a dispersed storage network (DSN) by incorporating namespace health into automated decisions to power off or disable disks in the DSN system. Extending the life of individual drives leads to an extension of the life of the entire DSN system. The term disk drive as used herein refers to a computer device which allows a computer to read from and write to computer disks. Each disk drive operates by spinning a disk and reading data from it using a drive head. Embodiments of the invention reduce power consumption required to spin disks by selectively disabling and/or enabling the spinning of the disks. All disks store nonvolatile data, meaning the data is not erased when the power is turned off. Each disk may be partitioned into several smaller volumes.

In general, the term namespace health as used herein refers to the overall health of disk drives within a DSN. Health of the disk drives refers to the ability of a client or user to utilize the disk drive for its intended purpose as needed. For example, the health of the DSN depends on whether data can be loaded to a disk(s) as needed, whether data can be obtained from a disk(s) as needed, and the time it takes to obtain and/or store data in the DSN. In embodiments, the incorporation of namespace health parameters in decision making processes of the invention prevents the availability, reliability, and performance of the DSN system from being impacted by powering off/disabling a portion of drives in the DSN system. In implementations, the use of namespace health plays a role in bringing down drives in a way that the overall disk drive pool within the DSN continues to be healthy. In aspects, a system is provided that prevents drives from being disabled when the drives are needed to service client requests given an amount of missing data, or when the drives are needed to rebuild missing data. For example, if drives are needed to be up for rebuilder purposes, or too many slices are missing, then embodiments of the invention will wait for rebuilding to progress before powering down associated drives.

In aspects, the number of drives in a DSN that are powered off can vary based on an amount of rebuilding needed, number of slices missing, client Input/Output (I/O) profile, etc. For example, more drives can be powered off for a longer periods of time if the DSN system is completely healthy and no new writes and deletes are coming to the system (e.g., a full storage system that is used for archival purpose). Alternatively, embodiments of the invention may wait to power off drives when a DSN system includes a predetermined number of missing slices and new data deletions or data writes are coming into the DSN system.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
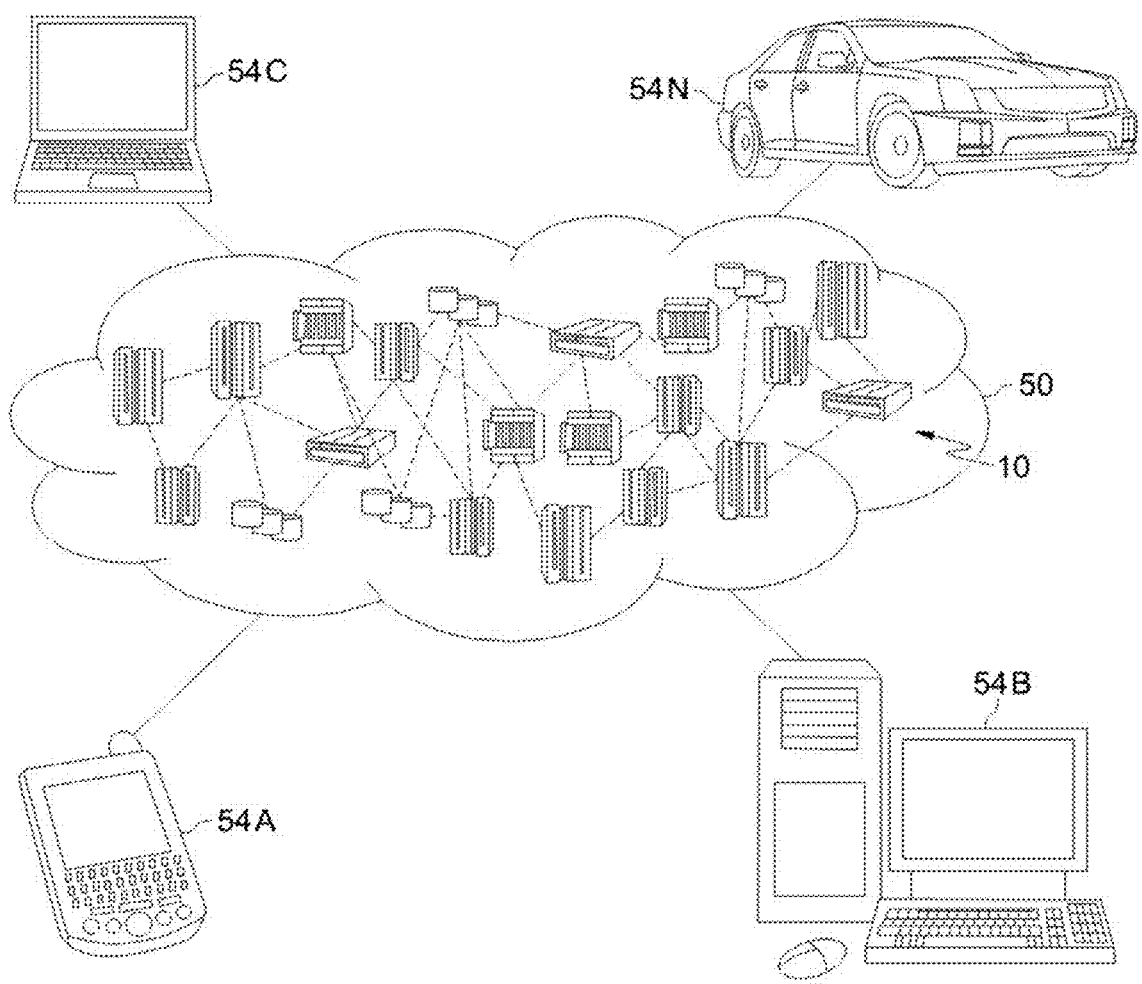
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
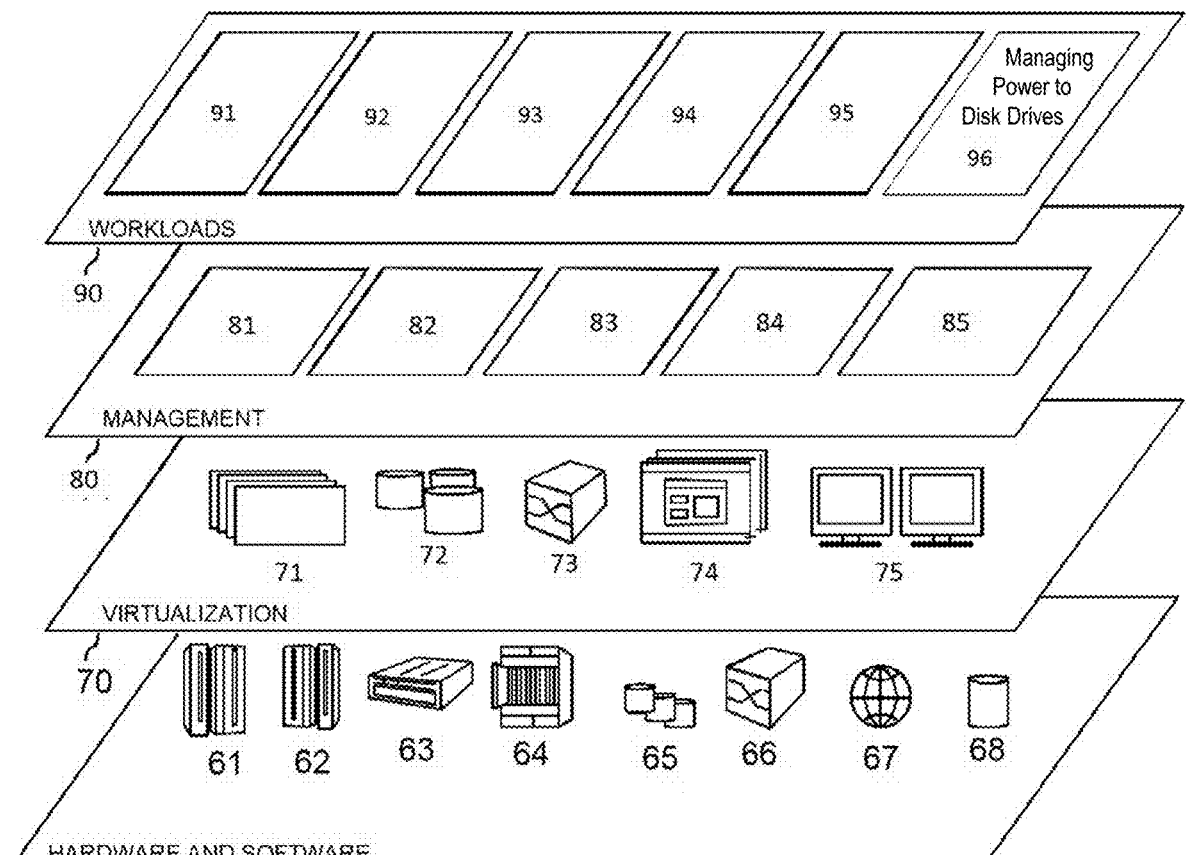
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and managing power to disk drives 96.

Implementations of the invention may include a computer system/server 12 of FIG. 1 in which one or more of the program modules 42 are configured to perform (or cause the computer system/server 12 to perform) one or more functions of the managing power to disk drives 96 of FIG. 3. For example, the one or more of the program modules 42 may be configured to: monitor namespace health parameters for data storage devices within a DSN; determine whether to enable or disable power to select disk drives based on the monitoring and stored power management rules, and send instructions to one or more power managers to enable or disable power to the select disk drives in a way that does not interfere with the anticipated needs of a client to access a data collection on the DSN.

Figure 4:
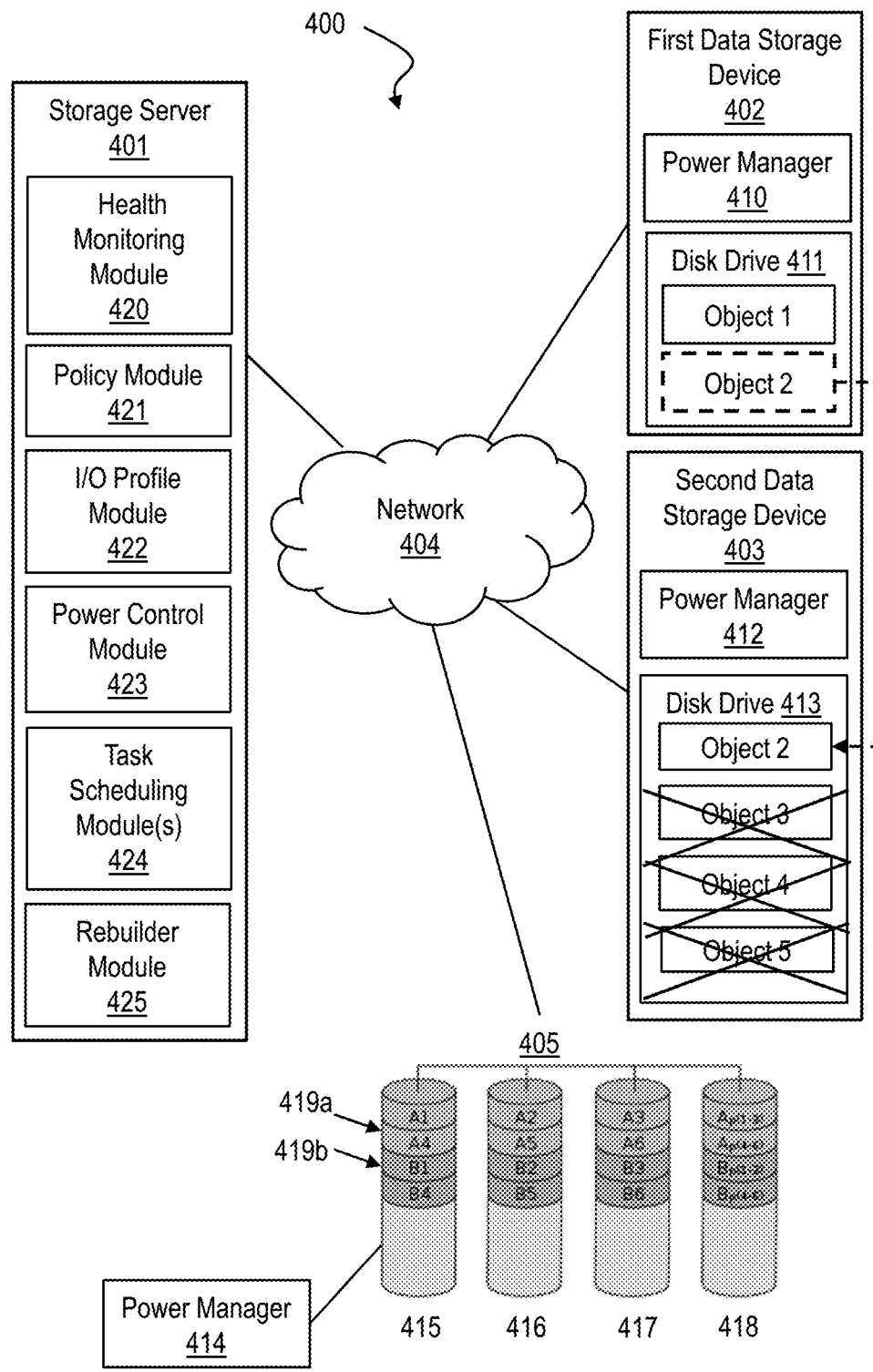
FIG. 4 shows a block diagram of an exemplary environment in accordance with aspects of the invention.

FIG. 4 shows a block diagram of an exemplary DSN 400 in accordance with aspects of the invention. In embodiments, the DSN 400 includes a storage server 401 in communication with multiple data storage devices represented by the first data storage device 402, the second data storage device 403, and a redundant array of independent disks (RAID) 405, via the network 404. In embodiments, the DSN 400 comprises a cloud storage system in which digital data is stored in logical pools. In implementations, physical storage within the DSN 400 spans multiple servers.

The network 404 may be any suitable communication network or combination of networks, such as a local area network (LAN), a general wide area network (WAN), and/or a public network (e.g., the Internet). In aspects, the storage server 401 is in the form of the computing device 12 of FIG. 1 and comprises a special purpose computing device that is part of a DSN infrastructure. In embodiments, the first data storage device 402, the second data storage device 403 and the RAID 405 each include components of the computing device 12 of FIG. 1. In aspects, cloud storage services of the first data storage device 402, second data storage device 403 and/or the RAID 405 are accessed by the storage server 401 through a web service application programming interface (API) or by applications that utilize the API.

In implementations, the first data storage device 402 includes a power manager 410 configured to enable or disable power to a plurality of disk drives represented at 411, wherein each disk drive is configured to store a plurality of data objects on disks, such as Object 1 and Object 2. In embodiments, the second data storage device 403 also includes a power manager 412 configured to enable or disable power to a plurality of disk drives represented at 413, wherein each disk drive is configured to store a plurality of data objects on disks, such as Objects 2-5. The power managers 410 and 412 may comprise hardware and/or software (e.g., a power switch controller) enabling control of power to one or more disk drives of the DSN 400.

In aspects, the RAID 405 includes a plurality of disk drives 415-418 for storing data objects, each including a plurality of storage tiers represented at 419a and 419b. In aspects, the RAID 405 includes a power manager 414 configured to manage power enablement and disablement to disks of the RAID 405. The power manager 414 may comprise hardware and/or software (e.g., a power switch controller) enabling control of power to one or more disk drives of the DSN 400. In embodiments, original data files to be stored in the DSN 400 are dispersed into a number of file "slices" or subsets in such a manner that the data in each file share is less usable or less recognizable or completely unusable or completely unrecognizable by itself except when combined with some or all of the other file shares. In such cases, the slices may be dispersed within a single data storage device (e.g., RAID 405) or within a plurality of data storage devices (e.g., the first data storage device 402 and the second data storage device 403). One of ordinary skill in the art would understand that a variety of data storage devices may be utilized within the DSN 400, and details of such data storage devices need not be described herein.

Still referring to FIG. 4, in embodiments, the storage server 401 includes one or more program modules (e.g., program modules 42 of FIG. 1) executed by the storage server 401 to perform one or more of the functions described herein. In implementations, the storage server 401 includes one or more of the following program modules: a health monitoring module 420, a policy module 421, an I/O profile module 422, a power control module 423, one or more task scheduling modules 424, and a rebuilder module 425.

In implementations, the health monitoring module 420 is configured to monitor (continuously or periodically) namespace health parameters. In implementations, the namespace health parameters include data indicative of the health of disk drives in the DSN 400. As noted above, the term "health of the disk drives" refers to the ability of a client or user to utilize the disk drive for its intended purpose as needed. For example, the health of the DSN 400 depends on whether data can be loaded to a disk(s) as needed, whether data can be obtained from a disk(s) as needed, and the time it takes to obtain and/or store data in the DSN 400. In implementations, the health monitoring module 420 monitors data regarding predicted use of disk drives within the DSN 400 (e.g., based on historic use data or stored rules), data regarding a status of the disk drives (e.g., failed drives and disabled and enabled drives) within the DSN 400, and data regarding scheduled tasks to be performed with respect to the disk drives (e.g., moving data, writing data, reading data, rebuilding data, etc.). In aspects, the health monitoring module 420 monitors task scheduling data from one or more task scheduling modules 424 to determine future scheduled tasks for storage devices in the DSN 400.

For example, the health monitoring module 420 may determine when an object is to be moved from one data storage device to another (e.g., see the illustration of Object 2 moving from the first data storage device 402 to the second data storage device 403), may determine that objects are scheduled for deletion (e.g., see the illustration of Objects 3-5 in the second data storage device 403 scheduled for deletion), or may determine that objects are scheduled for rebuilding by the rebuilder module 425.

In embodiments, the policy module 421 is configured to store and manage power management rules. In general, the power management rules include rules regarding when power to individual disks within the DSN 400 may be enabled or disabled. Such rules may be client (user) specific, and may also be specific to particular collections of data of a client. In aspects, the power management rules include read and write thresholds for individual data collections in the DSN 400. The term read threshold as used herein refers to a minimum number of disks needed to read data in a data collection (wherein the data collection is spread across a plurality of disks). Similarly, the term write threshold as used herein refers to a minimum number of disks needed to write data to the data collection. In embodiments, power management rules set threshold limits for power enablement or disablement based on anticipated use of one or more disks, the status of the one or more disks, read and write thresholds, and scheduled tasks to be performed with respect to the one or more disks. In aspects, the policy module 421 provides clients with a user interface through which power management rules may managed (e.g., entered or modified) by the client.

In implementations, the I/O profile module 422 is configured to store data regarding I/O requirements for particular clients accessing the DSN 400. Data regarding I/O requirements may be obtained directly from a client or administrator during client registration or at another time after client registration, and/or may be determined using cognitive methods and tools. In implementations, the I/O profile module 422 records historic use data for each client (e.g., business entity), and analyzes the historic use data to determine patterns of use. The patterns of use may include a time range during the day, week or year in which the DSN 400 is typically utilized by the client, particular times the client accesses the DSN 400 (e.g., weekdays only), the type of activity conducted (e.g., reading data, writing data, deleting data, rebuilding data, etc.), and/or when different types of activities are conducted.

In embodiments, the power control module 423 is configured to determine when power to one or more disk drives (e.g., disk drives 411 and 413) in the DSN 400 may be enabled or disabled, based on the monitoring performed by the health monitoring module 420 and power management rules in the policy module 421. Additionally, the power control module 423 is configured to generate instructions to one or more power managers (e.g., power manager 410, 412, 414) in the DSN 400 to initiate the selective power enablement or disablement to the disk drives (e.g., disk drives 411 and 413).

In implementations, one or more task scheduling modules 424 are each configured to generate, store and update a tasks schedule for future tasks to be implemented, such as moving, deleting, and rebuilding stored objects (e.g., Objects 1-5) in the first data storage device 402, second data storage device 403 and/or the RAID 405 of the DSN 400.

In implementations, the rebuilder module 425 also comprises a task scheduling module. In aspects, when portions of a data collection (e.g., dispersed file share) are missing or unavailable, the rebuilder module 425 is configured to rebuild or repair the data collection.

In implementations, there exist multiple tiers of different storage medium in the DSN 400, such as storage pool of SSDs or hard drives. These different storage tiers may have different price, performance and availability characteristics. Objects stored within such a system may be migrated between tiers to satisfy customer service level agreements (SLAs), reduce cost, or improve performance characteristics of the system. These migration events may be triggered by user defined actions or via automatic decisions made with respect to different attributes of the object such as, but not limited to, age and access patterns. Objects on the DSN 400 may also be scheduled for deletion at some upcoming time via policies put in place by DSN operators.

Figure 5:
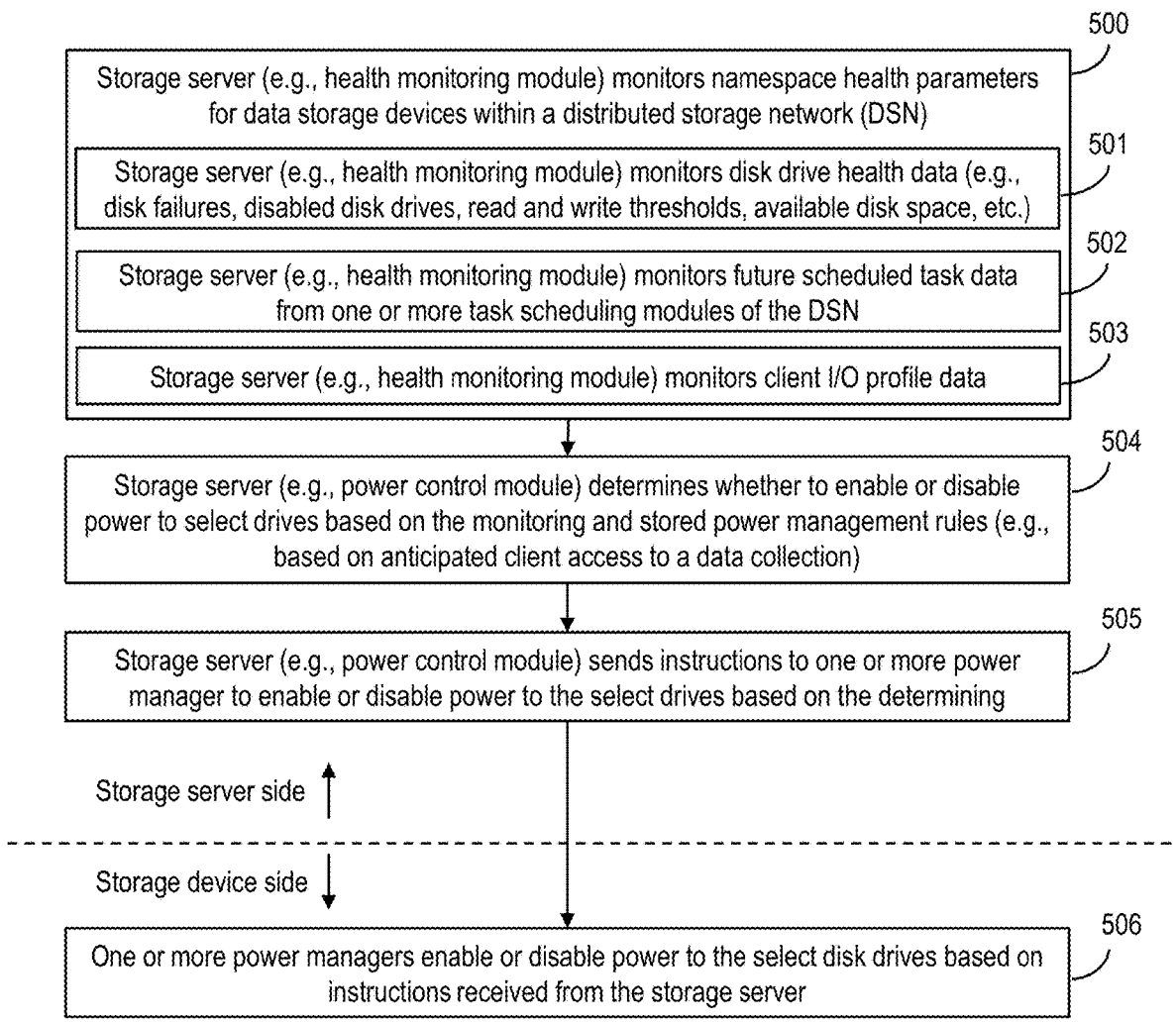
FIG. 5 shows a flowchart of an exemplary method in accordance with aspects of the invention.

FIG. 5 shows a flowchart of an exemplary method in accordance with aspects of the present invention. Steps of the method may be carried out in the environment of FIG. 4 and are described with reference to elements depicted in FIG. 4.

At step 500, the storage server 401 monitors namespace health parameter data for data storage devices (e.g., first data storage device 402, second data storage device 403, and RAID 405) in the DSN 400. As noted above, the term namespace health as used herein refers to the overall health of disk drives within a DSN (e.g., DSN 400). Health of the disk drives refers to the ability of a client (user) to utilize one or more disks (i.e., perform tasks) as needed for a particular data collection. The term data collection as used herein refers to a collection of data stored over a plurality of disks in the DSN 400. For example, the health of the DSN 400 depends on whether data can be written, read, rebuilt, migrated and deleted as needed, and whether the task can be performed in a timely manner (e.g., within a predetermined time). The storage server 401 may monitor namespace health parameter data continuously, periodically or a combination thereof for different types of namespace health parameter data. In implementations, the monitoring of step 500 comprises the gather of namespace health parameter data by the storage server 401. In implementation, the storage server 401 determines anticipated client access needs with respect to a data collection stored on the DSN based on the monitoring. Anticipated client needs may take into account: 1) current operable disk drives, disk drives scheduled to be accessed based on future scheduled tasks, and disk drives that are likely to be access based on client I/O profile data. In embodiments, the health monitoring module 420 of the storage server 401 implements step 500.

In substep 501, the storage server 401 monitors disk drive health data for data storage devices with the DSN 400 (e.g., 401, 403 and 405) to determine a status or availability of one or more disks (e.g., disks storing a data collection or virtual data container). For example, a disk is available when it is working properly (e.g., power is enabled, a client can access data stored on the disk and the disk is healthy). The disk drive health data may include disk drive failures, disabled disk drives, available disk space, or other data regarding the health of the data collection. For example, the storage server 401 may determine that a virtual data container must have 5 of 7 disks available in order to read the data therein, and may determine that only 4 of the 7 disks are available, rendering the status of the virtual data container unreadable. The storage server 401 may utilize data stored in the policy module 421 to determine the status of the one or more disks or virtual data containers. In embodiments, the health monitoring module 420 of the storage server 401 implements substep 501.

In substep 502, the storage server 401 monitors future scheduled task data of one or more tasks scheduling modules (e.g., task scheduling modules 424, the rebuilder module 425) of the DSN 400 to determine which tasks will be performed, wherein the tasks will be performed, and when the tasks will be performed. For example, the storage server 401 may monitor future scheduled task data to determine when one or more of the following tasks are scheduled for one or more data collections: deleting stored objects, migrating stored objects, and rebuilding stored objects. In embodiments, the health monitoring module 420 of the storage server 401 implements substep 502. In aspects, the health monitoring module 420 obtains future scheduled task data from the one or more task scheduling modules of the DSN 400, and determines tasks to be performed based thereon.

In substep 503, the storage server 401 monitors client I/O profile data to predict activity of clients with respect to the DSN 400. In embodiments, the health monitoring module 420 of the storage server 401 implements substep 503. In aspects, the health monitoring module 420 obtains the client I/O profile data from the I/O profile module 422. As noted above, the client I/O profile module 422 is configured to store data regarding I/O requirements for particular clients accessing the DSN 400. Data regarding I/O requirements may be obtained directly from a client or administrator during client registration or at another time after client registration, and/or may be determined using cognitive methods and tools. In implementations, the I/O profile module 422 records historic use data for each client (e.g., business entity), and analyzes the historic use data to determine patterns of use. The patterns of use may include a time range during the day in which the DSN 400 is typically utilized by the client, particular days the client accesses the DSN 400 (e.g., weekdays only), the type of activity conducted (e.g., reading data, writing data, deleting data, etc.), and/or when different types of activity are conducted.

At step 504, the storage server 401 determines whether to enable or disable power to select disk drives (e.g., disk drives 411 and 413) within the DSN 400 based on the monitoring of step 503 and stored power management rules in the policy module 421. In implementations, the storage server 401 determines subsets of disk drives to enable or disable in a manner that avoids disrupting a client's anticipated access to a data collection of the DSN 400. For example, the storage server 401 may determine that a subset of disk drives associated with a data collection may be disabled when the number of operable (e.g., enabled) disks remaining meets a predetermined read threshold for the data collection (e.g., the client can read data from the data collection when 7 of 9 disk drives are operating/powered). In embodiments, the power control module 423 of the storage server 401 implements step 504. In aspects, the health monitoring module 420 communicates with the power control module 423 and the policy module 421 to implement decision making regarding the select disk drives to enable or disable, and a time period in which to initiate the enabling or disabling of power to the select disk drives. The monitoring of the namespace health parameters at step 500 can result in the time period for enabling/disabling power being adjusted in real time based on changing namespace health parameters in the DSN 400, such as disk failures, new future scheduled tasks, etc. In aspects, the storage server 401 determines that a subset of the disks in the DSN 400 may be disabled based on the monitoring and stored power management rules. In aspects, the storage server 401 determines that power to one or more disabled disks in the DSN 400 should be enabled based on the monitoring and stored power management rules.

At step 505, the storage server 401 sends instructions to one or more power managers (e.g., 410, 412 and 414) in the DSN 400 to selectively enable and/or disable disk drives (e.g., disk drives 411, 413 and 415-418), based on the determining of step 504.

At step 506, the one or more power managers (e.g., 410, 412, and 414) of data storage devices on the DSN 400 (e.g., 402, 403 and 405) enable or disable power to the select disk drives (e.g., disk drives 411, 413 and 415-418) based on instructions received from the storage server 401.

An exemplary scenario will now be discussed with respect to FIG. 5. In this example, the storage server 401 obtains client data for a virtual storage container of the client, which indicates that the virtual storage container comprises 9 disks, has a write threshold of 7 disks, and has a read threshold of 5 disks. In this case, the client data is obtained from the policy module 421. Accordingly, in this example, 7 of the 9 disks must be available for write tasks, and 5 of the 9 disks must be available for read tasks. In accordance with step 500 of FIG. 5, the storage server 401 monitors namespace health parameter data for the first data storage device 402 and the second data storage device 403, within which the 9 disks are housed. The health monitoring module 420 of the storage server 401 determines that 8 of the disks are currently available, and 1 disk has failed. The health monitoring module 420 also determines, based on client I/O profile data, that the client only performs read tasks on the virtual storage container on weekdays. The health monitoring module 420 further determines in accordance with step 502 of FIG. 5, that there are no scheduled future tasks for the virtual container within a 10 day time span. In accordance with step 504 of FIG. 5, the power control module 423 obtains information from the health monitoring module 420, and based on the rules from the policy module 421, determines that only 5 disks need to be available on weekdays, that 8 of 9 disks are currently available, and that an additional 3 of the 9 disks may be disabled on select weekdays within the 10 day time span while still meeting the anticipated access requirements of the client. In this example, the power control module 423 sends instructions to the power manager 410 and the power manager 412 with instructions to disable 3 select disks of the 9 disks spread between the first data storage device 402 and the second data storage device 403, which causes the respective power managers 410 and 412 to disable power to the 3 select disks. Once disabled, the 3 select disks do not spin, thus reducing power consumed with the DSN 400. It can be understood that, within a large scale DSN 400, the select disablement of a plurality of disks over time would lead to significant energy savings, as well as reducing the wear on disk drives within the DSN 400.

Still referring to the above exemplary scenario, the power control module 423 further determines that power to a select 2 of the 3 disabled disks should be enabled after the select weekdays, based on namespace health parameters indicating that: 7 of the 9 disks are needed for write tasks, the client typically writes to the virtual container on weekends, 8 of the 9 disks are capable of being enabled (e.g., 1 disk has failed), and there are no future scheduled tasks that require more than 7 of the 9 disks to be powered/enabled. In this example, the power control module 423 sends instructions to the power manager 410 and the power manager 412 with instructions to enable the select 2 disks of the 3 disabled disks spread between the first data storage device 402 and the second data storage device 403, which causes the respective power managers 410 and 412 to enable power to the 2 select disks for the weekend. This results in 7 of the 9 virtual container disks being enabled, which meets the access requirements of the client with respect to the virtual container.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
    monitoring, by a computing device, namespace health parameter data in a distributed storage network (DSN) including a plurality of storage disk drives, wherein the namespace health parameter data includes available disks of the plurality of storage disk drives and future schedule task data gathered from one or more task scheduling modules of the DSN;
    predicting, by the computing device, future client access needs with respect to data stored in the DSN based on the namespace health parameter data;
    determining, by the computing device, that power to a subset of the plurality of storage disk drives can be disabled without disrupting the predicted future client access needs with respect to the stored data on the DSN based on the monitoring and stored power management rules; and
    sending, by the computing device, instructions to at least one power manager within the DSN to disable power to the subset of the plurality of storage disk drives, the instructions including a set time period in which to initiate the disabling the power, resulting in at least one disabled storage disk, wherein the instructions are based on the determining that power to the subset of the plurality of storage disk drives can be disabled without disrupting the predicted future client access needs at the set time period.

2. The computer-implemented method of claim 1, further comprising:
    determining, by the computing device, to restore power to the at least one disabled storage disk in the DSN based on the monitoring and stored power management rules; and
    sending, by the computing device, instructions to the at least one power manager within the DSN to restore power to the at least one disabled storage disk.

3. The computer-implemented method of claim 1, further comprising monitoring client input and output data regarding access of a client to the data collection to generate historic use data, wherein the namespace health parameter data includes the historic use data.

4. The computer-implemented method of claim 3, wherein historic use data are selected from at least one of the group consisting of: a time period when the client is accessing the plurality of storage disk drives; a time period when the client is not accessing the plurality of storage disk drives; and how the client is utilizing the plurality of storage disk drives.

5. The computer-implemented method of claim 1, wherein the namespace health data are selected from at least one of the group consisting of: storage disk failures; disabled storage disk drives; and available storage disk space; and
    the stored power management rules comprise read and write thresholds for the data collection.

6. The computer-implemented method of claim 1, wherein a service provider at least one of creates, maintains, deploys and supports the computing device.

7. The computer-implemented method of claim 1, wherein the monitoring, determining and sending are provided by a service provider on a subscription, advertising, and/or fee basis.

8. The computer-implemented method of claim 1, wherein the computing device includes software provided as a service in a cloud environment.

9. The computer-implemented method of claim 1, the method further comprising:
    determining, by the computing device, to restore power to the at least one disabled storage disk in the DSN based on the set time period; and
    sending, by the computing device, instructions to the at least one power manager within the DSN to restore power to the at least one disabled storage disk, wherein:
    the historic use data includes a time period when the client is accessing the plurality of storage disk drives and a time period when the client is not accessing the plurality of storage disk drives;
    the monitoring of the future schedule task data includes monitoring the following future scheduled tasks to be implemented: deleting stored objects, migrating stored objects and rebuilding stored objects; and
    the predicting future client access needs with respect to data stored in the DSN comprises analyzing historic use data to determine patterns of use including time ranges of client use, types of activities conducted, and when each of the types of activities are conducted.

10. A computer program product, the computer program product comprising one or more computer readable storage media and program instructions collectively stored on the one or more computer readable storage media, the program instructions executable by a computing device to cause the computing device to:

continuously monitor namespace health parameter data for a plurality of storage disk drives associated with a data collection of a client in a distributed storage network (DSN) wherein the namespace health parameter data includes future schedule task data gathered from one or more task scheduling modules of the DSN;

predict future client access needs with respect to data stored in the DSN based on the namespace health parameter data;

determine that power to a subset of the plurality of storage disk drives can be disabled without disrupting the predicted future client access needs with respect to the data stored on the DSN based on the monitoring and stored power management rules; and selectively enable and disable power to the subset of the plurality of storage disk drives without disrupting the predicted client access needs with respect to the data stored on the DSL based on the monitoring and stored power management rules.

11. The computer program product of claim 10, wherein the stored power management rules include a write threshold and a read threshold for the data collection; and the program instructions further cause the computing device to send instructions to at least one power manager within the DSN to disable power to the select ones of the plurality of storage disk drives for a set period of time.

12. The computer program product of claim 10, wherein the program instructions further cause the computing device to:

determine the select ones of the plurality of storage disk drives to enable based on the monitoring and the stored power management rules, wherein the stored power management rules include a write threshold and a read threshold for the data collection; and send instructions to at least one power manager within the DSN to enable power to the select ones of the plurality of storage disk drives.

13. The computer program product of claim 10, wherein the program instructions further cause the computing device to monitor client input and output data regarding access of the client to the data collection to generate historic use data, wherein the namespace health parameter data includes the historic use data.

14. The computer program product of claim 13, wherein historic use data are selected from at least one of the group consisting of: a time period when the client is accessing the plurality of storage disk drives; a time period when the client is not accessing the plurality of storage disk drives; and how the client is utilizing the plurality of storage disk drives; and the stored power management rules comprise read and write thresholds for the data collection.

15. The computer program product of claim 10, wherein the namespace health data are selected from at least one of the group consisting of: storage disk failures; disabled storage disk drives; and available storage disk space.

16. The computer program product of claim 10, wherein the monitoring of the future schedule task data includes monitoring the following future scheduled tasks to be implemented: deleting stored objects, migrating stored objects and rebuilding stored objects.

17. A system comprising:

a processor, a computer readable memory, and one or more computer readable storage media associated with a computing device;

program instructions to predict future client access needs with respect to a data collection stored on the DSN based on continuously monitoring namespace health parameter data in a distributed storage network (DSN) including a plurality of storage disk drives, wherein the namespace health parameter data includes future scheduled task data gathered from one or more task scheduling modules of the DSN; and program instructions to selectively enable and disable power to select ones of the plurality of storage disk drives without disrupting the predicted future client access needs based on the monitoring and stored power management rules, wherein the program instructions are collectively stored on the one or more computer readable storage media for execution by the processor via the computer readable memory.

18. The system of claim 17, further comprising:

program instructions to determine a first subset of the plurality of storage disk drives to disable based on the monitoring and the stored power management rules, wherein the stored power management rules include a write threshold and a read threshold for the data collection;

program instructions to determine a second subset of the plurality of storage disk drives to enable based on the monitoring and the stored power management rules; and program instructions to send instructions to at least one power manager within the DSN to disable power to the first subset of the plurality of storage disk drives for a set period of time and to restore power to the second subset of the plurality of storage disk drives.

19. The system of claim 17, further comprising monitoring client input and output data regarding access of a client to the data collection to generate historic use data, wherein the namespace health parameter data includes the historic use data.

20. The system of claim 19, wherein historic use data are selected from at least one of the group consisting of: a time period when the client is accessing the plurality of storage disk drives; a time period when the client is not accessing the plurality of storage disk drives; how the client is utilizing the plurality of storage disk drives; storage disk failures; disabled storage disk drives; and available storage disk space.

\* \* \* \* \*